Nov. 24, 1953

R. J. HERBOLD

2,660,703

ELECTRICAL METHOD AND APPARATUS FOR GEOPHYSICAL PROSPECTING

Filed April 26, 1952

INVENTOR.
Robert J. Herbold
BY
Clayton L. Jenks

Nov. 24, 1953

R. J. HERBOLD 2,660,703

ELECTRICAL METHOD AND APPARATUS
FOR GEOPHYSICAL PROSPECTING

Filed April 26, 1952

INVENTOR.
Robert J. Herbold
BY
Clayton L. Jenks

Patented Nov. 24, 1953

2,660,703

UNITED STATES PATENT OFFICE 2,660,703

ELECTRICAL METHOD AND APPARATUS FOR GEOPHYSICAL PROSPECTING

Robert J. Herbold, Denver, Colo., assignor to Lafayette M. Hughes, Denver, Colo.

Application April 26, 1952, Serial No. 284,665

14 Claims. (Cl. 324—6)

This invention relates to a method of and an apparatus for geophysical prospecting or exploration.

One standard method of exploring subterranean structures for oil comprises exploding a charge either on or beneath the surface of the ground, such as in a test drill hole, and attempting to interpret the echo waves as indications of strata boundary surfaces, but such knowledge gives no direct evidence as to the nature or composition of the underground materials. There are also many methods for making electrical measurements, such as the transient time-potential studies of the conductivity of the earth strata, but their time-wasting, expensive and complicated procedures in the preparation and interpretation of the plotted data likewise give no direct qualitative indications. Radar waves are propagated as bundles of high frequency waves which echo back from a reflecting surface, and these wave signals are spaced so that the echo is received at the sending station between the sending impulses. This system involves measuring a time interval indicating the distance but not the nature of an object from which the waves have been reflected. Such knowledge has led some to try to find anomalies in earth structure by means of subterranean reflected radio waves, although it has been commonly considered that such waves generated in the air do not penetrate the earth deeply but are largely reflected from the surface. These attempts have involved generating radio waves above the ground and attempting to insert them into the earth strata and from reflected waves developed thereby obtaining an indication of the direction and distance of subterranean reflecting boundary surfaces, and thereby plotting a contour map based on observed anomalies. Such procedures have involved measuring the reactance on the antenna emission or the determination of variations in field strength at a receiver moved to various distances. For example, the frequency of a radio transmitter may be altered and a direction finding receiving coil may be moved to various locations and distances for varying the reflection angle and the coil rotated to a position of maximum reception. Anomalies in the plotted field strength data thus obtained are interpreted in terms of strata variations. Interference methods involve measuring variations in field strength due to an interference between waves traveling by different routes through the air and reflected from strata within the earth. Such time potential studies have not provided satisfactory methods for determining directly the qualitative nature of the underlying strata, and particularly to show whether oil or other desired material is present. Only a direct analysis of the core or material from a test drill hole has shown the nature of the earth strata thus bored.

In the course of my experimentation, I have discovered that electrical waves may be best transmitted through the earth if they are initiated and radiated as a wave front of energy within the medium through which they are to be transmitted, and that a high energy wave front initiated by a single electrical pulse will cause subterranean media to return waves selectively and qualitatively characteristic of various geologic formations.

The primary objects of my invention are to provide an electrical apparatus for and a method of geophysical prospecting whereby an electrical pulse may be transmitted deeply into the subterranean formations, and return waves selectively and qualitatively characterizing geologic media within the earth may be received and interpreted as an indication of the nature of the media. Other objects will be apparent in the following disclosure.

Referring to the drawings illustrating a preferred embodiment of my invention.

In accordance with my geophysical prospecting method, I insert into the earth a high energy electrical pulse of short duration, and there develop a descending wave front which causes various subterranean media to respond selectively to the wave impact by returning characteristic waves. The return waves are received in succession and their patterns portrayed, preferably by an oscillograph of a suitable type, and from these wave patterns a qualitative study of the earth media may be made.

The electrical pulse is either a single wave or an alternating or oscillative pulse that is substantially instantaneous and quickly attenuated. Its pattern curve of energy plotted against time should have a very steep or rapidly changing front, such as the wave pattern developed by the discharge of a condenser through a spark gap. To generate the wave front, I provide an antenna which is formed primarily of and within the earth, and the pulse is transmitted to that earth antenna by spaced terminals within the earth. This earth antenna comprises that horizontal earth zone located close to the earth-air boundary, and the effective portion of the electrical field developed in that zone may be considered as a substantially horizontal electromagnetic field which radiates downwardly.

The series of return waves generated by the pulse wave front are received by a sensitive receiver antenna, such as a coil insulated from but located close to the earth. The current thus induced by the returning electromagnetic waves cutting the coil is amplified and employed for indicating or recording the wave patterns. This induced current serves preferably to govern an oscillograph, such as a cathode ray oscillograph which portrays a pattern characteristic of the returning signal waves. Thus the nature of the strata or media that provide these harmonic return waves as a secondary ascending wave front is indicated by an intelligent interpretation, based on prior shots of known formations, of the wave patterns shown on the oscillograph screen or other type of recorder employed for the purpose.

A primary requirement is that there should be a single short pulse of high energy, the voltage of which ordinarily ranges above 10,000 volts and preferably 40,000 volts or more and it may be higher than 200,000 volts. The electrical shock wave front, as initiated at the earth antenna and radiated downwardly therefrom, is preferably caused by the discharge into the antenna of a spark from a high voltage condenser bank, but other high energy sources may be employed, such as the discharge of a thyratron or a high voltage Tesla coil circuit, where a single spark from the generator may be considered as comprising a half wave direct current pulse. The capacity of a suitable condenser is preferably at least 1 microfarad and it may be 10 or more microfarads. A satisfactory return signal is obtained by discharging a condenser of 1 microfarad capacity at 50,000 volts.

If this wave front were initiated above the earth surface, a large portion of its energy would be transmitted through the air and reflected upwardly, as well as refracted and dissipated in the upper layers of the earth, but by initiating the wave front within the earth material, the electrical energy is not attenuated by a ground-air surface reflection and dispersion losses incident to the wave penetrating the earth from the air but is directed downwardly. Certain conditions have been found important for developing this shock wave front. The antenna comprises a substantially horizontal earth zone immediately below and close to the earth-air boundary surface. That zone should be of extensive horizontal area capable of dissipating the electrical energy and setting up the wave front in a broad band or sheet-like formation. The terminals for introducing the electrical pulse to this antenna zone should contact with the earth only close to the surface, so that the electrostatic lines of force between the two spaced terminals may be substantially horizontal just beneath the earth-air boundary, with the electromagnetic lines of force also horizontal and at right angles to the electric field. Thus, the wave front is initiated solely within the earth below the reflecting earth-air boundary and it expands primarily downwardly. The effective portion of the pulse wave front may be considered as remaining substantially horizontal, so that when it strikes a given subterranean medium the harmonic oscillation developed therein will in turn set up a substantially horizontal wave front that travels in part vertically upward to the receiver which is located close to the transmitter.

The antenna terminals are linearly extensive conductors within the earth and are preferably formed of wet earth which has a much higher conductivity than that of the antenna formed of the drier earth material between these two spaced terminals. Since a comparatively wide band of antenna is required, such as one that has a length of several feet on each side, the terminals are best formed by pouring or spreading onto the ground in two spaced extensive bands or paths a quantity of water or a conductive solution or aqueous electrolyte, such as a salt (NaCl) solution. A suitable amount of aqueous solution is that sufficient to wet the earth only to a very shallow depth, such as an inch or two in the case of porous soil, or which merely provides a surface contact for rock or hard pan. Suitable conductors are connected with these two spaced wet earth terminals for transmitting the spark or other high energy pulse thereto.

The return waves are received by an antenna, such as a helical coil of fine insulated wire of a suitable number of turns, and preferably a single helix of wire arranged with the coil axis horizontal or parallel with the ground surface so that an ascending horizontal wave front will cut the coils to the maximum extent. Various types of receiving antenna may be employed for the purpose, but it should be fully insulated from the ground so that it is not affected by ground currents or thus be able to indicate conductivity or earth potential. I have found that although a vertical axis coil will receive some of the return waves, the horizontal axis coil gives a far greater reception; and in fact this horizontal arrangement of the coil axis indicates that the effective portion of the return wave front is substantially horizontal, and the receiver is not affected materially by vertical ground wave fronts traveling horizontally. The receiver is suitably connected to an indicating or recording apparatus and preferably an oscillograph which shows patterns characterizing the return waves.

This method of geophysical prospecting may be carried on by means of various types of apparatus. In the drawings, I have shown a preferred form comprising an apparatus for developing a high energy spark pulse and inserting it into the earth and for receiving and recording the return waves. This apparatus is preferably portable for the purpose of exploring the geological strata readily. As shown diagammatically in Fig. 1, a preferred portable construction comprises an automobile truck 1 of suitable type carrying an electrical generator 2 of alternating current which is driven by a suitable gasoline motor 3. The generator is connected to charge a bank of condensers 4 which are connected to two spaced earth antenna terminals 5 and 6 through a spark gap 7. A receiving coil 8 suitably insulated from the earth and located outside of the antenna zone 9 between the terminals 5 and 6 is suitably connected through an amplifier 10 with a cathode ray oscillograph 11.

Each of the wet earth terminals 5 and 6 may be formed by pouring water in an extensive comparatively narrow band and with a required spacing, and the electric pulse may be inserted into those spaced wet earth terminals by means of one or more metal prod plates 12 (Fig. 4) having short spikes 13, such as from 1 to 3" long, welded to or otherwise suitably secured to project below the bottom of the plate and conduct current to the wet earth terminal into which the prods are inserted. A suitable metal handle 14 may serve for locating the plate and as a connecter for the electric current flow. I, however, prefer to employ for this purpose a standard soil soaking hose 15 (Fig. 3) made of porous canvas suitably supplied with water, such as from a metal stand pipe 16 to which the end of the hose is secured by a suitable or standard hose pipe screw threaded connection 17. The stand pipe 16 comprises a vertical tube of a few inches in diameter and a foot or two high forming a reservoir for water. The ends of two canvas hose pipes are secured by the thread couplings 17 to outlet plugs on the opposite sides of the stand pipe. The outer ends of the hose pipes may be suitably closed so that when water is poured into the reservoir 16 it will fill each of the hose pipes and will leak gradually through the canvas walls onto the ground and thus soak into the ground and spread laterally for a short distance. Ordinarily, I find that a gallon or two of water is adequate for each stand pipe for use in dry earth territory. By limiting the quantity of water, I insure that the wet earth terminal 5 or 6 formed thereby extends only to a very shallow depth into the earth, so that any spark discharge in the earth antenna 9 between the two terminals 5 and 6 finds its shortest path immediately beneath the earth-air boundary surface and thus results in what is presumed to be a horizontal electromagnetic field that originates in a narrow sheet-like boundary antenna zone.

If it is required to insert a pulse wave front into rock or hard pan of low porosity, the hose pipe terminals may be laid on the surface of the rock and only a small amount of water used so that it will form a comparatively narrow wet band of rock at each terminal 5 or 6. The dry rock between these terminals serves as the dry earth antenna 9. Incidentally, all earth and rock are believed to carry some water or electrically conductive material, so that the electric pulse will be satisfactorily dissipated and conducted between these two wet earth terminals 5 and 6. The antenna zone between the terminals however has a higher resistance than has the terminals and is capable of dissipating the power of the electrostatic discharge. A rope or a flat mat of wicking or a burlap strip of narrow width and a suitable length may be initially wet with water and laid on the ground and these may carry a lead-in conductor wire and thus serve for the antenna terminals. The electrical connection to each wet earth terminal may be made by suitably attaching a conducting wire to the metal of each stand pipe 16. If it is desired to distribute the electrical charge more uniformly throughout the length of each hose pipe, a few strands of fine wire 18 (Fig. 3) connected into the metal coupling 17 or otherwise secured to the stand pipe may be wrapped around a wicking 19 inserted in and extending throughout the length of the hose. The electric charge leaks off the wire and to the wet earth throughout the length of the hose pipe. Various expedients may be adopted to insure a field of desired shape and uniformity.

Figures 1, 3, 4:
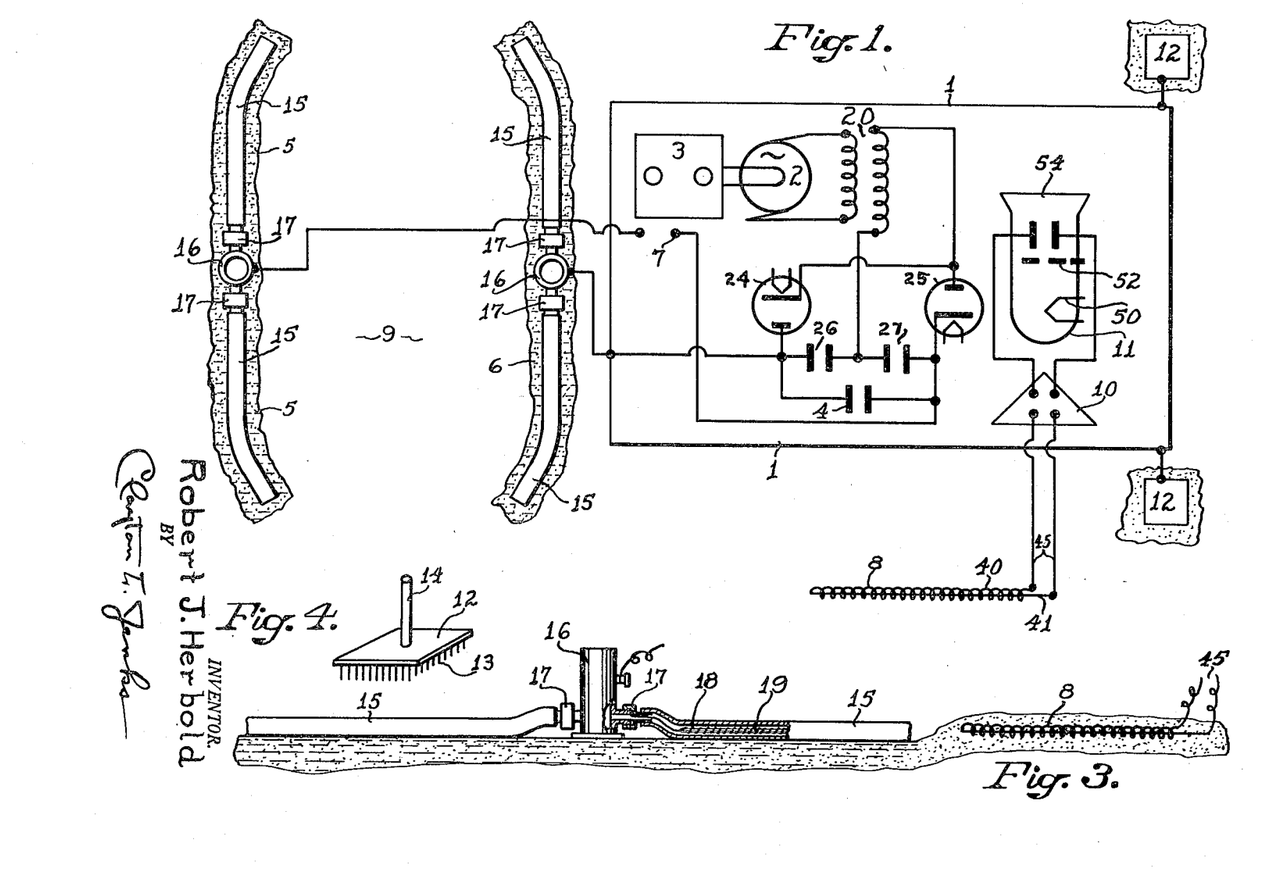
Fig. 1 is a diagrammatic plan view of a mobile unit carrying the electrical apparatus and showing the relations of the transmitting antenna and the receiving coil and their electrical systems.
Fig. 3 is a vertical sectional view of the surface portion of the ground showing the receiving coil diagrammatically and one transmitting antenna terminal in elevation and partly broken away.
Fig. 4 is a perspective view of another form of earth terminal.

For the sake of safety, the automobile 1 may be grounded by connecting one of the wet earth antennas 6 to its metal framework, and a set of prod plates 12 of the type shown in Fig. 4 connected to the auto framework may have its prongs 13 inserted in wet earth formed by pouring water onto the ground. The prod terminals 12 and their wet earth contacts at the far end of the automobile remote from the antenna 6 may also take part to some extent in the formation of the electric field. However, the antenna terminals 5 and 6 are the primary conductors for determining that field pattern.

Figure 2:
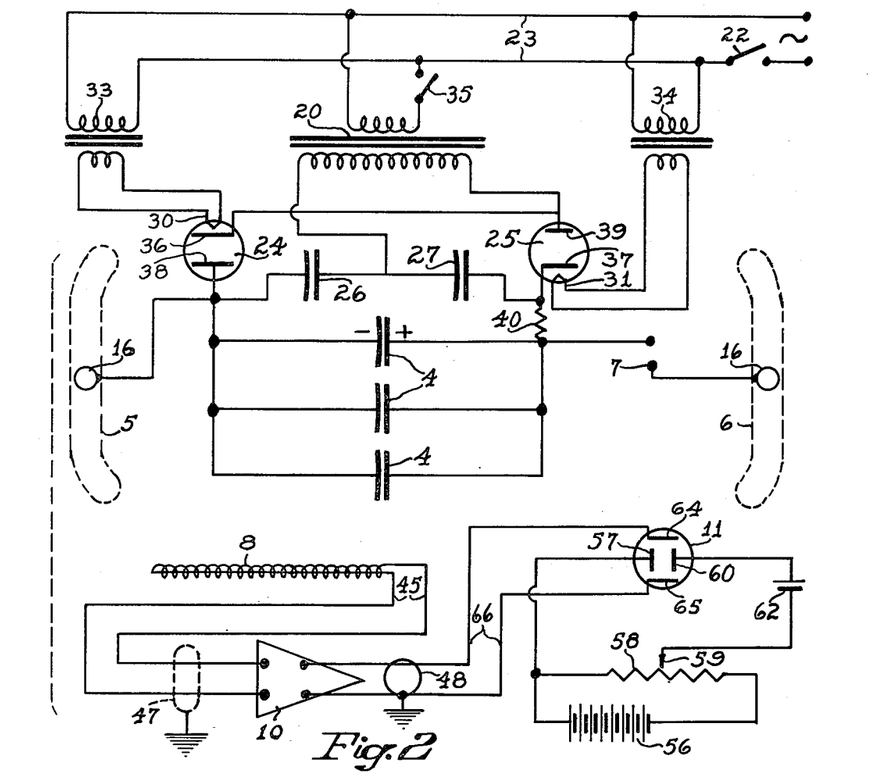
Fig. 2 is a wiring diagram for the transmitting and the receiving apparatus.

Various types of pulse generating and transmitting systems may be employed in accordance with standard knowledge or as may be found suitable. The form illustrated in Figs. 1 and 2 comprises a suitable step-up transformer 20 which is capable of converting the current in its primary, as generated by the A. C. generator 2, to a high secondary voltage sufficient for charging the condenser 4 to a required voltage, such as 10,000 volts. A suitable switch 22 in the line 23 (Fig. 2) controls the operation of the transformer. The high voltage current from the transformer secondary coil is rectified by two diode rectifiers 24 and 25, preferably arranged in a full wave doubler circuit, which alternately charge two condensers 26 and 27 to the transformer peak voltage. These condensers in turn serve to charge the condenser bank 4 comprising a suitable number of condensers of a required capacity, such as 1 to 10 microfarads, which are arranged to be discharged through the spark gap 7 formed of adjustably spaced metal balls carried on a suitably insulated mounting. One set of plates (Fig. 2) of the condenser bank 4 is connected through one terminal of the spark gap 7 to the water tank 16 which supplies the hose pipe of antenna terminal 6, and the other set of plates is connected to the water tank 16 of the second antenna terminal 5 as illustrated. The rectifiers 24 and 25 are shown in reverse arrangement so as to make full use of each cycle of the transformer current. The cathode heaters 30 and 31 of these two rectifiers are respectively heated by means of two suitable transformers 33 and 34 which are energized by the A. C. line 23 from the generator 2, or otherwise as may be desired. After the switch 22 has been closed and these transformers have heated their respective rectifier cathodes, then the further switch 35 to the main transformer 20 may be closed to charge the condenser bank and ultimately cause the spark discharge. Since the rectifiers pass current in only one direction and are in a reverse arrangement, the current carried from the cathodes 36 and 37 of the diodes to the anodes 38 and 39 will serve to charge the plates of the two condensers 26 and 27 through the connections shown. A resistance 40 serves to prevent overloading the rectifiers and limits the rate of charging the condenser banks 4. The various condensers are connected as illustrated in Fig. 2, or otherwise as desired. The condensers may be charged in parallel at 10,000 volts and the circuits so arranged that they may be discharged in series in order to increase the voltage for the same charging wattage. Thus when the spark gap 7 breaks down, a single pulse of extremely short duration, whether or not it oscillates, is transmitted to the two wet earth terminals 5 and 6 and the electrostatic charge is dissipated in the comparatively dry earth zone 9 forming the earth antenna.

The shape and size of the antenna will depend somewhat upon the type of earth material. In locations of low rainfall such as found in northern Texas and Colorado, I have found that the energy is adequately dissipated to form the shock wave front if the wet earth terminals are from about 20 to 30 feet long and if they are spaced from 10 to 20 feet. The widths of the wet earth bands are not important, except as is required to insert the electrostatic charge into the earth. That is, the two canvas hose pipes connected to each stand pipe may be from 10 to 15 feet long and preferably of equal length, so that the ends of the wet earth paths are equi-distant from the stand pipe and associated conductor connected to a spark gap terminal. I have also found it desirable to curve the outer ends of the hose pipes 15 inwardly, such as shown in Fig. 1, so as to aid in distributing the electrostatic charge as uniformly as possible by thus progressively shortening the distance of the path through the dry earth antenna towards the terminal ends. The canvas hose may be shaped in any way that is desired to obtain the best results in the return signal. As above stated, a wire 18 may be used, if desired, to aid in the electrostatic charge distribution to the antenna 9. In a territory having considerable moisture in the upper earth layer, it may be desirable to space the wet earth terminals more widely to provide a proper distribution and dissipation of the electrostatic charge. The antenna area is so related to the electric power inserted into the earth as to drive the wave front to a desired depth penetration. The lengths of the antenna terminals and their spacing are accordingly varied as determined by the antenna earth resistance which governs the power input. Precautions need to be taken to prevent the formation of short circuiting paths between the wet earth terminals and to insure the distribution of the electric current into a sheet-like formation. In actual practice, I lay one set of hose pipes of 8 or 10 feet length fairly close to the rear of the automobile truck and space the other set of pipes therefrom by a suitable distance, such as 8 or 10 feet. Similarly, when the shot is to be made on a rock formation, the hose pipes 15 are laid on the surface of the rock, and precautions are taken to see that the water does not form a rivulet or a short circuiting path between the terminals. The hose pipe may contain a water absorbing porous wicking or the like, with or without the wire 18, which slows down the leakage of water therefrom and maintains two spaced linear or band shaped areas of the rock wet for a longer period of time, without danger of forming short circuiting paths. Only a slight amount of water on the adjacent portion of the rock or dry earth is needed to make that water a part of the earth even though it is present in only a very thin layer.

Figure 5:
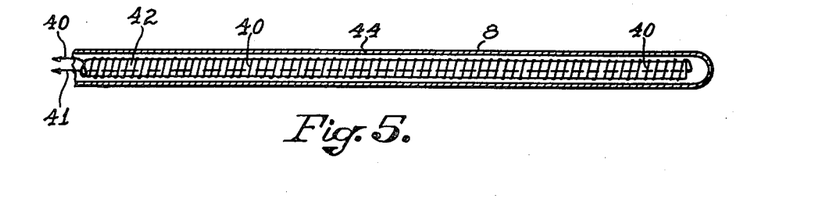
Fig. 5 is a fragmentary longitudinal section of the receiving coil.

The receiving apparatus illustrated comprises the coil 8 connected through a suitable amplifier 10 with a cathode ray type of oscillograph 11. The receiving or pick-up coil may be variously constructed, but I prefer one of the general type and arrangement shown diagrammatically in Fig. 5. This coil may comprise a length of fine insulated copper wire 40 wound in a single turn as a helix on and coaxial with one end portion of the wire or on a dielectric. For this purpose, a straight length 41 of the insulated wire may be embedded in a suitable insulating or dielectric medium 42 and the helix may be formed by winding the remaining portion of the wire about that wire or dielectric as illustrated. The wire is preferably a #30 (.012" diameter) copper wire, but I may use other sizes, such as between #20 and #40, which are provided with enamel or other suitable insulation. The wire has an insulating coating and is wound in close lateral contact on a central core 42 of some 3 or 4 feet in length and 0.25 inch diameter, so that usually at least 250 to 400 feet of a fine wire are in the helix. It is found that an optimum reception is obtained with a length of about 300 feet of #30 wire in the helix. Such a wire coil has a low resistance and low impedance. The wire coil may be coated with or embedded in an insulating mastic (omitted in Fig. 5 for clarity of illustration) and the outer sheath 44 formed of such mastic or a further covering provides a complete insulation against stray ground currents. This extensive receiver antenna, with its insulation around and between the different coils of the helix, may be about $\frac{5}{16}$" diameter. There may be as many as 1200 turns of the helical wire, but it will be noted that these are preferably arranged in a single layer and that no turns are wound around others. Whatever theoretical considerations may apply to the length of the receiver wire, I have built the antenna experimentally in the dimensions specified, and these are found to give the best reception of the different return waves that are normally received. The wire coil and its insulation are preferably such that the receiver is flexible and subject to rough handling, and the insulation is waterproof so that the coil may be buried in the ground without interfering with its reception. The terminal wires 45 of the coil are suitably connected to the amplifier 9.

I have found that optimum reception is obtained by burying the coil 8 slightly beneath the earth surface, as shown in Fig. 3, and this may be accomplished by laying the receiver coil on the ground and then covering it with a thin layer of dirt and stamping that dirt in place. Hence the return waves are received directly from the earth and do not have to cross the earth-air boundary before they are picked up by the coil. It is also thought that the shallow arrangement of the receiver in its mound of earth minimizes the reception of ground waves that may be travelling parallel to the earth surface.

The receiver connecting wires 45 may be shielded and grounded, as indicated at 47 in Fig. 2. These wires connect to the amplifier 10, which has an impedance preferably matching that of the receiver coil. The amplifier is preferably constructed to provide a clipper or limiter so that the amplifier will pick up a very weak oscillating or alternating wave signal, but the amplitude of this wave will be limited to prevent the amplified oscillation of the current from going beyond the voltage capacity of the oscillograph. That is, the amplifier increases the amplitude of the received wave and the clipper cuts off the tops of the curves of the high amplitude portions but does not affect the curves of lesser amplitude that are within the capacity of the oscillograph. This amplifier is connected to the oscillograph 11 through a grounded co-axial cable 48.

The antenna terminals 5 and 6 distribute the electrical energy of the pulse surge into the dry ground antenna 9 in a wide horizontal zone or sheet-like field located primarily between the wet earth terminals 5, 6 and 12, and the antenna 8 is located well outside of that transmitter antenna zone defined by these terminals. That is, the receiver coil is located outside of the area of confusion caused by the initial quickly attenuating ground waves or the induction field developed between the transmitter terminals, so that the antenna pick-up coil 8 is not burned out by the first surface wave or surge developed by the initial shock, and the return signals picked up by the receiver are not confused with any shock or decay of the initial pulse. On the other hand, the receiver 8 is located close enough to the transmitting antenna 9 so that for return waves which have come from many hundreds or thousands of feet, the receiver may be considered as being located where a vertically descending wave and its initiated return signal wave traveling vertically will give a substantially maximum reception in the receiver. Usually, the receiver line 45 (Fig. 1) may extend for 15 or 20 or more feet at right angles to the side of the truck 1, as illustrated, whereas the antenna terminals 5 and 6 are located at one end of the automobile. Hence the initial quickly attenuating ground waves or the first surge of energy caused by the spark, or other medium capable of developing a high energy pulse, will not affect the return signal materially.

The oscillograph indicator or recorder may be of various types which determine the form or pattern of a wave, represented as a time curve showing the frequency and amplitude of the wave energy. A preferred type is that known as a cathode ray oscillograph, and I prefer to employ one capable of regulation for providing a variable or controllable linear sweep of an electron beam which oscillates according to the return wave pattern. It is shown in the drawings as the electromechanical equivalent of a suitable electronic apparatus that will be employed, such as a standard DuMont oscillograph type 250 or 280. It comprises a cathode-ray tube in which an electron gun forms a stream of electrons which are converged to a narrow beam by anodes providing axially symmetrical electric fields. A suitable cathode and heater element 50 (Fig. 1), such as an oxide coated heater disk arranged to heat indirectly a cathode cylinder, provides the stream of electrons. A suitably controlled negative grid 52 provided with a small aperture serves to limit the number of electrons forming the beam. A fluorescent or phosphorescent screen 54 receives the electrons as a small spot which is swept across the screen as a persistent line of visible light capable of being viewed by eye or preferably photographed by a suitable camera having its film ready for exposure.

As indicated in Fig. 2, the oscillograph system comprises a suitable battery 56 connected at its positive terminal to one of a pair of deflecting plates 57 and connected at its negative terminal to the other plate 60 through a resistor 58 having a uniformly moved contact 59 and through a battery 62 opposed to the battery 56. When considered mechanically, movement of the contact 59 at a uniform and suitable rate across the resistance of the potentiometer 58 causes the voltage applied to the plate 60 to be gradually increased and the electron beam to move towards the plate of positive voltage and sweep progressively across the screen. This sweep, which provides the time axis for the return signal curves, is accomplished by any suitable electrical system providing a linear or saw tooth sweep circuit, such as a relaxation oscillator comprising a gas filled glow discharge tube, such as a pentode or a thyratron, and a condenser charged and discharged through a resistance, which serves to time the sweep and to synchronize the signal wave.

The device is provided with adjustments for varying the frequency and amplitude of the linear sweep circuit and particularly to control the length of the sweep and the spot position so as to select a given portion of the returning waves for showing on the screen. Also the selected oscillograph comprises a power supply in opposition to the normal electron flow in association with a diode which are so connected and adjusted as to limit or clip the peak of the wave to the voltage level of the power supply. A sweep circuit which causes the spot sweep to be triggered by the signal wave may comprise a beam blanking circuit in which a negative pulse is applied to the grid of the cathode ray tube at the end of the sweep and so holds the sweep at rest until it is again triggered by another outgoing signal wave. A travelling sensitive photographic film or magnetic tape may furnish the time element and obviate the use of a sweep circuit and its deflecting plates in the oscillograph.

The oscillograph is so constructed and regulated that the sweep is triggered by the initial signal wave but the record is primarily one of the returning waves, since the initial outgoing wave is quickly attenuated. A second pair of plates 64, 65 perpendicular to plates 57, 60 within the oscillograph is connected to the amplifier 10 through the grounded coaxial cable 66 to receive the return signal from the amplifier. These plates 64, 65 move the fluorescent spot laterally of its sweep in accordance with the return wave signals and so impress on the line of light such curves as are characteristic of the subterranean media.

For interpretation of the signal wave curves, it is desirable to photograph or otherwise record the curves, such as by well-known photographic apparatus having a film sensitive to the fluorescent image of the screen, which may be green, blue or other photogenic color, such as a RCA 906 or 908 tube. The sweep in the standard oscillograph may be adjusted to show on the screen any desired portion of the returning signals, so that by adjusting the spot position and extending the length of the sweep time axis to the widest limit, I may adjust the position of the image on the screen, and selectively record in succession various portions of the signals and thus provide a plurality of photographs which may be assembled as a long band record made to show the entire depth of earth strata return waves as a log. That is, the photograph of the oscillograph record of a first shot of the geologic strata may show the return signals from the first thousand feet or so of depth, and a record of a second duplicate shot, after re-positioning the spot, will show the next lower series of strata, and so on. This gives the maximum time axis amplification of the signals, and a long band type of log may be developed therefrom.

The spark discharge is considered to have the characteristics of many wave lengths, so that each of various subterranean substances subjected to the impact or shock of the traveling wave front may selectively respond according to its own resonant or harmonic characteristics and thus initiate a return wave of a given frequency that is invariable for that medium. The spark discharge has a very steep or abrupt wave front, as indicated by a voltage time curve, and it quickly dies out with an unimportant and quickly attenuated oscillation due to the recharge and discharge of the condenser plates, like the transmission of a lightning bolt. This oscillation decays quickly and whatever ground wave or other disturbing influence is set up thereby does not travel far or confuse the interpretation of the return signals materially. The oscillograph sweep may be so adjusted as to minimize the recording of that oscillating wave.

The oscillograph wave pattern which is characteristic of the returning signal waves has a shape determined by the type and the control settings of the oscillograph, but all return waves are subjected to the same controls and so are comparable. The shock wave front should be in the form of a sheet or broad band formation between the two wet earth terminals, and wherein the electrostatic flow is made as uniform as possible. If a buried wire were used as an antenna, it would presumably set up a circular electromagnetic field radiating towards the receiver coil, and so would defeat the required purpose. It may also be noted that it is not desirable to use spaced wires on or buried in the dry earth for the two antenna terminals 5 and 6, because of the great difference in conductivity between the wire and the earth antenna of high resistance is likely to develop short circuiting paths. The wet earth terminal resistance is nearer to that of the earth antenna and this results in a gradual distribution of the electrostatic charge into the dry earth antenna zone.

The electrical shock, like a single hammer blow on the support of vibrant metal wires of different lengths, is thought to initiate or induce in subterranean media various secondary resonant or harmonic waves whose patterns may depend on the effective capacitance, inductance, resistance and other electrical properties, as well as density, homogeneity, rigidity or other physical and chemical properties of the medium that is shocked by the initial pulse. Such media as water, coal, oil and other geologic formations give noticeably different responses and their wave patterns may be identified selectively with the originating media.

Figure 6:
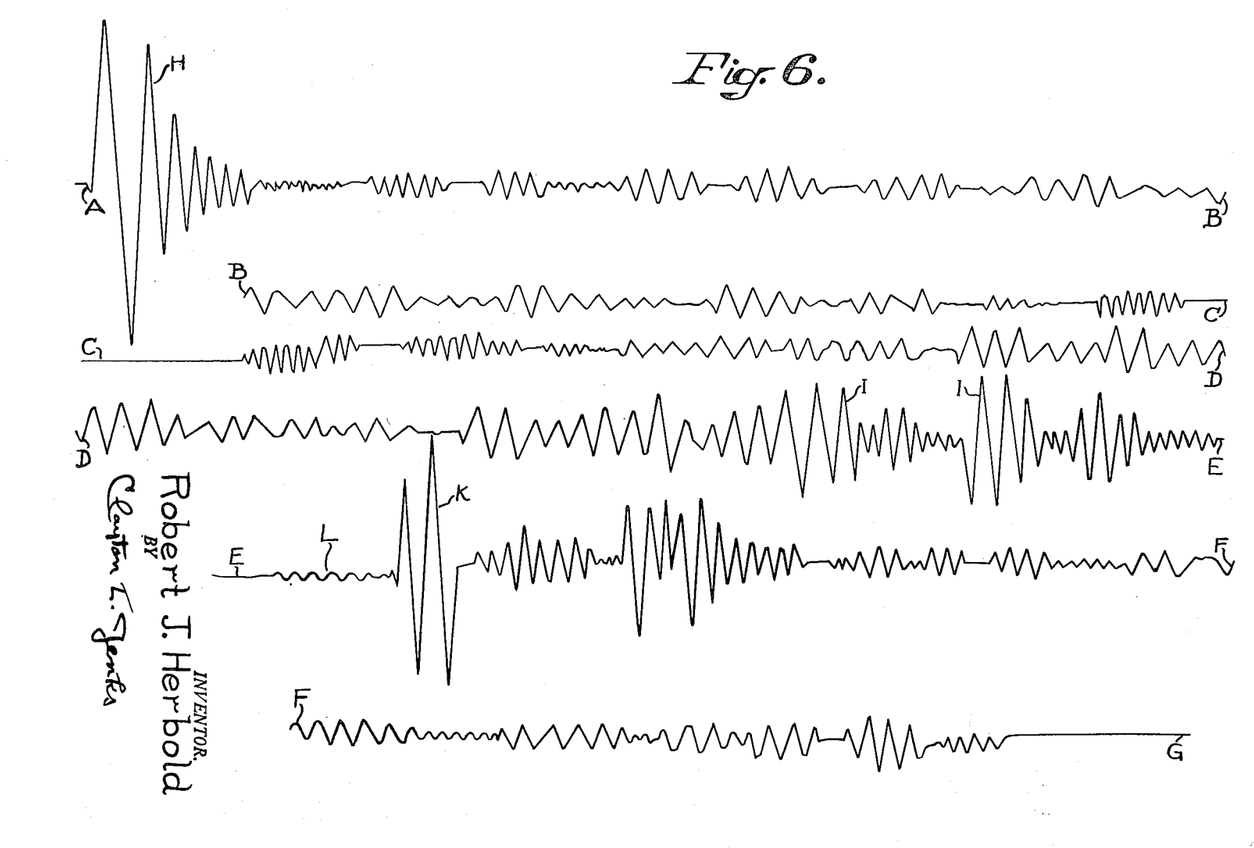
Fig. 6 shows a series of curves approximately representing an oscillograph record of a geophysical prospecting operation.

Fig. 6 gives a typical record derived by making a succession of three duplicate shots in the same location, in which the sweep of the cathode ray oscillograph was adjusted each time to show the return waves from successively lower portions of the subterranean strata. These curves are elongated and vertically magnified enlargements of photographic records of the oscillograph screen taken in the successive shots, and although somewhat inaccurate because of the difficulties in reproducing them manually, they nevertheless are typical of a prospecting operation at a given location. The right hand long margin of the drawing sheet may be considered the x-axis and the bottom short margin of the page the y-axis, representing a time-amplitude record of the series of return signal waves. Viewing the curves from left to right and from top to bottom, the curves are to be considered as connected together at their ends as a single long curve or log, as indicated by the duplicate letters BB, CC, DD, EE and FF. The oscillograph log starts at A with a high amplitude and quickly attenuating series of oscillations H which presumably represent the initial shock of the spark discharge. The various strata immediately below the ground-air surface send back characteristic oscillations. The top two curves A to C represent approximately the record received on a single oscillograph shot. The next two ending at E represent a second oscillograph record in which the sweep was regulated to get waves from the next lower series of strata, and the last two curves terminating at G give a record of the deepest strata thus surveyed. The sharp oscillations, such as at I, are presumed to represent the presence of water or highly conductive strata conditions. Water is a continuous phase of an electrical conductor, and it gives sharp high amplitude oscillograph curves at its upper and lower boundaries or throughout the zone, due presumably to the mineralization and high conductivity of the material which absorbs the wave. A much sharper and higher amplitude curve shown at K is believed to represent salt water. A pulse of high energy will pass through such water layers. On the other hand, oil is a dielectric or non-conductor and it comprises a continuous homogeneous phase usually found in a discontinuous rock, sand or shale phase. Oil has a uniform density and its wave curve appears to be sinusoidal and to have a uniform frequency, as indicated by the curve L. Other homogeneous media, such as a homogeneous layer of coal, are believed to give a uniformly oscillating harmonic wave somewhat similar to that of oil. A heterogeneous geologic formation appears to give complex waves. A gradual change in density in the strata will show as a gradual change in the shape of the signal curve. By making records of known oil fields and comparing them with the records in unknown territory, a reasonable interpretation may be made from which the presence of oil may be predicated.

The operation and utility of the method will now be apparent. By its use, it is possible to obtain a direct record of many subterranean media or formations, and particularly water and oil, because of the selective return signals which characterize such formations. The apparatus is simple in construction and operation, and only a few minutes of time are required for making a shot, so that the operator may explore a large territory in a comparatively brief time. The oscillograph records are interpretable in the field, and the operator may proceed intelligently and without delay in his exploration. Many other advantages will be obvious.

It will also be apparent that many modifications may be made within the knowledge of one skilled in the art without departing from the spirit and scope of this invention. Hence the above description of a preferred method and embodiment is to be interpreted as not imposing limitations on the appended claims.

This case is a continuation in part of my co-pending application, Serial No. 234,583, filed June 30, 1951.

I claim:

1. The method of geophysical exploration comprising the steps of establishing two spaced, linearly extensive, antenna terminals within the earth and located only close to the earth-air boundary and providing relative to said boundary an extensive, shallow, substantially horizontal sheet-like antenna zone of earth material between the terminals capable of dissipating a high energy electrical pulse, developing and discharging to said terminals a high energy pulse of short duration and initiating primarily a downwardly radiating horizontal wave front within the earth, and causing subterranean media successively activated by the wave front at different depths to initiate a series of vertically ascending return waves which progressively and selectively characterize said media, receiving said return waves directly from the earth and generating thereby an induced current of related characteristics and recording the successive wave patterns thereof which characterize the progressively deeper strata activated by said pulse and wave front.

2. The method according to claim 1 comprising the step of impregnating the earth with water to a shallow extent in two widely spaced extensive bands and forming a horizontal antenna zone of drier earth therebetween which is immediately below and close to the earth-air boundary, and inserting the electrical pulse into said spaced bands and the antenna zone.

3. The method of geophysical exploration comprising the steps of impregnating the earth with water to a shallow depth in two widely spaced linearly extensive bands and forming spaced antenna terminals separated by a wide antenna zone of drier earth therebetween, transmitting a high voltage electrical pulse to the wet earth bands and thereby initiating in said zone close to but below the earth-air boundary a downwardly radiating electrical wave front, receiving directly from the earth at a position outside of but close to said zone a vertically ascending return electrical wave initiated within a subterranean medium by said pulse and wave front, and obtaining a pattern characteristic of the return wave for interpretation as to the nature of said medium.

4. The method of geophysical exploration comprising the steps of building up a condenser charge to a potential of at least 10,000 volts and at least one microfarad capacity, wetting spaced linearly extensive terminal areas of the earth with water to a shallow depth and forming therebetween a horizontal antenna zone of comparatively drier earth capable of dissipating the charge and forming an electrical field, discharging the charge as a pulse of short duration into said terminal areas and to a shallow depth and initiating the formation of a substantially horizontal electrical field close to the earth-air boundary but within said earth zone and developing a descending horizontal wave front which selectively initiates vertically ascending return electrical waves within and characterizing various subterranean media at different depths, receiving the successive return waves at a locus substantially within the earth and close to but outside of the antenna zone and generating thereby an induced current of related characteristics, and recording the successively received return waves characterizing the induced current as interpretable wave patterns which distinguish various media.

5. Apparatus for geophysical exploration comprising electrical apparatus for providing a high energy electrical pulse of short duration, two opposed antenna terminals in linearly extensive electrical contact with the earth adjacent its surface which are spaced by an earth zone of extensive horizontal area constituting an earth antenna located within the earth close to the earth-air boundary, means for discharging the pulse between the terminals and thereby initiating in the antenna a horizontal electrical field forming a descending wave front which in turn initiates return electrical waves characterizing subterranean media, receiving apparatus, including an antenna near the earth-air boundary but insulated from the earth and located close to but outside of said zone where it receives primarily a vertically ascending return wave directly from the earth without material reception of horizontally traveling waves, which provides an induced current of characteristics related to the return waves, and means governed by the current for indicating a pattern of the return waves which characterizes said media.

6. Apparatus according to claim 5 in which the receiving apparatus comprises a coil of many turns of wire insulated from but located close to the earth for receiving a return wave therein.

7. Apparatus according to claim 5 in which the receiving antenna comprises a helical coil of many turns of wire insulated from but substantially contacting with the earth which has the axis of the helix in a substantially horizontal position.

8. Apparatus for geophysical exploration comprising a generator of a high energy electrical pulse, two widely spaced, extensive, wet earth antenna terminals separated by a relatively drier horizontal earth zone serving as a transmitting antenna within the earth located close to the earth-air boundary, means for discharging the pulse into and initiating within the earth zone a downwardly radiating wave front for selectively initiating in subterranean media various return signal waves characterizing said media, a receiver having an antenna coil located with the coil axis horizontal and outside of but close to the transmitting antenna zone and insulated from the earth for receiving upwardly traveling return signal waves, an amplifier for the return signal waves, and an oscillograph governed by the amplifier for indicating patterns characteristic of the return waves which may be interpreted as to the geologic nature of said media.

9. Apparatus according to claim 8 in which the pulse generator comprises a condenser having plates providing a capacity of at least one microfarad, and spark gap terminals connecting the opposed condenser plates respectively to the spaced antenna terminals and arranged for discharging the condenser and providing an electrical pulse as a high energy wave front characterizing a single spark discharge.

10. Apparatus according to claim 8 in which a transmitting antenna terminal comprises a porous hose, means providing a water supply therefor and an electrical connection from the generator to the water in the hose, so that the electrical pulse is conducted to the earth antenna through the water from the hose contacting with the earth.

11. Apparatus according to claim 8 in which the antenna terminals comprise two extensive porous bodies capable of holding water and imparting it slowly to the earth therebeneath, a separate metal tank connected to supply water to each body and having electrical terminal connections, and the pulse generator comprises a condenser having plates of at least one microfarad capacity and spark gap terminals connecting the opposed plates respectively with the two tanks, so that discharge of the plates through the spark gap provides a single short duration high energy electrical field in the antenna zone.

12. Apparatus according to claim 8 in which the earth antenna forms an extensive zonal area having its horizontal dimensions at least ten feet in length and which provides for dissipation of the electrical energy and the formation of a descending wave front.

13. Apparatus according to claim 8 in which the receiver circuit comprises a coil of many turns of insulated wire closely contacting with the earth, and the oscillograph has its sweep triggered by the pulse discharge and arranged to show a succession of distinctive curves characterizing various subterranean media.

14. Apparatus for geophysical exploration comprising an electrical generator, a high energy condenser charged thereby, a spark gap having spaced terminals, two extensive, widely spaced, shallow wet earth terminals connected respectively with the spark gap terminals and separated by an extensive horizontal drier earth antenna zone arranged for initiating a descending wave front close to the earth-air boundary, a receiver coil of many turns of wire insulated from but located outside of the antenna zone in contact with the earth and with the coil axis horizontal which is capable of picking up return signal waves selectively initiated in subterranean media by discharge of the condenser into the antenna zone, an amplifier for the received waves, and an oscillograph governed by the amplifier which records patterns characterizing the return waves, said oscillograph being regulatable to show waves from different subterranean depths so that different strata may be explored serially.

ROBERT J. HERBOLD.

References Cited in the file of this patent

UNITED STATES PATENTS

| Number | Name | Date |
|---|---|---|
| 2,037,306 | Blau et al | Apr. 14, 1936 |
| 2,291,596 | White | July 28, 1942 |
| 2,527,559 | Lindblad et al. | Oct. 31, 1950 |

OTHER REFERENCES

"Geophysical Exploration" by C. A. Heiland, first printing 1940, published by Prentice-Hall, Inc., pages 758 and 759.